(12) United States Patent
Matsumura

(10) Patent No.: US 12,282,280 B2
(45) Date of Patent: Apr. 22, 2025

(54) INFORMATION PROCESSING APPARATUS AND IMAGE FORMING APPARATUS WITH A CONTROLLER FOR DETERMINING AN ERROR PART IN THE IMAGE FORMING APPARATUS

(71) Applicant: CANON KABUSHIKI KAISHA, Tokyo (JP)

(72) Inventor: Takeshi Matsumura, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/079,981

(22) Filed: Dec. 13, 2022

(65) Prior Publication Data

US 2023/0195020 A1 Jun. 22, 2023

(30) Foreign Application Priority Data

Dec. 20, 2021 (JP) ................................ 2021-205977

(51) Int. Cl.
  *G03G 21/00* (2006.01)
  *G03G 15/00* (2006.01)
  *G03G 21/16* (2006.01)

(52) U.S. Cl.
  CPC ......... *G03G 15/55* (2013.01); *G03G 21/1647* (2013.01); *G03G 21/1676* (2013.01)

(58) Field of Classification Search
  USPC ......................................................... 399/36
  See application file for complete search history.

(56) References Cited

U.S. PATENT DOCUMENTS

| 5,946,521 | A | * | 8/1999 | Budnik | ............. | G03G 15/5033 |
| | | | | | | 399/24 |
| 2009/0285586 | A1 | * | 11/2009 | Kawaguchi | ............ | G03G 15/55 |
| | | | | | | 399/13 |
| 2012/0070161 | A1 | * | 3/2012 | Yashiro | .............. | G03G 15/2039 |
| | | | | | | 399/24 |
| 2015/0093123 | A1 | * | 4/2015 | Hano | ................. | G03G 15/0266 |
| | | | | | | 399/13 |

FOREIGN PATENT DOCUMENTS

JP  2010-034636 A  2/2010

* cited by examiner

*Primary Examiner* — Quana Grainger
(74) *Attorney, Agent, or Firm* — Venable LLP

(57) ABSTRACT

An information processing apparatus which communicates to and from an image forming apparatus for forming an image on a sheet. The image forming apparatus includes: a motor; a first load; a second load; a drive transmission mechanism configured to selectively transmit drive of the motor to the first load and the second load; and a control unit configured to control the drive transmission mechanism to transmit the drive of the motor to the first load so that the first load is driven, and to control the drive transmission mechanism to transmit the drive of the motor to the second load so that the second load is driven. The information processing apparatus comprising: an acquisition unit configured to acquire information related to an error that has occurred in the image forming apparatus, the information including timing information related to a time when the error occurs.

16 Claims, 9 Drawing Sheets

FIG. 7A

| ID | OCCURRENCE DATE/TIME | CUMULATIVE NUMBER OF PAGES | OCCURRING ERROR |
|---|---|---|---|
| 100 | 2021/06/15 13:00 | 1000 | TONER BOTTLE ROTATION ERROR |
| 101 | 2021/06/15 13:01 | 1000 | TONER BOTTLE ROTATION ERROR |
| 102 | 2021/06/15 13:02 | 1000 | BOTTLE COVER OPENING/CLOSING ERROR |

FIG. 7B

| ID | OCCURRENCE DATE/TIME | CUMULATIVE NUMBER OF PAGES | OCCURRING ERROR |
|---|---|---|---|
| 200 | 2021/07/15 13:00 | 2000 | BOTTLE COVER OPENING/CLOSING ERROR |
| 201 | 2021/07/15 13:01 | 2000 | BOTTLE COVER OPENING/CLOSING ERROR |
| 202 | 2021/07/15 13:02 | 2000 | BOTTLE COVER OPENING/CLOSING ERROR |

FIG. 7C

| ID | OCCURRENCE DATE/TIME | CUMULATIVE NUMBER OF PAGES | OCCURRING ERROR |
|---|---|---|---|
| 300 | 2021/07/05 13:00 | 1 | |
| 301 | 2021/07/15 13:01 | 100 | |
| 302 | 2021/07/25 13:02 | 500 | BOTTLE COVER OPENING/CLOSING ERROR |

FIG. 7D

| PART-TO-BE-REPLACED PATTERN | PART TO BE REPLACED |
|---|---|
| 1 | TONER-BOTTLE DRIVE MOTOR |
| 2 | BOTTLE COVER<br>COVER OPENING/CLOSING DETECTION UNIT |
| 3 | TONER-BOTTLE DRIVE MOTOR<br>BOTTLE COVER<br>COVER OPENING/CLOSING DETECTION UNIT |

INFORMATION PROCESSING APPARATUS AND IMAGE FORMING APPARATUS WITH A CONTROLLER FOR DETERMINING AN ERROR PART IN THE IMAGE FORMING APPARATUS

BACKGROUND OF THE INVENTION

Field of the Invention

The present disclosure relates to a technology for deducing an error cause in an image forming apparatus, such as a copying machine, a multi-function machine, a printer, and a facsimile machine.

Description of the Related Art

An electrographic image forming apparatus forms an image on a sheet by formation of a latent image and transfer. When an abnormality occurs, such an image forming apparatus has difficulties in determining in which step the abnormality occurs. Further, one abnormality may probably be associated with a plurality of parts. In a case in which replacement of a part is required due to occurrence of an abnormality, it is difficult to identify a part to be replaced. In this case, in order to identify a part to be replaced, parts are required be sequentially replaced and tested until the abnormality is overcome. This may increase an amount of work performed from the abnormality occurrence to recovery. In Japanese Patent Application Laid-open No. 2010-034636, there is disclosed an image forming apparatus in which a count value of jams is notified and information related to part replacement is displayed on an operation panel, thereby reducing an amount of work of a service person at the time of abnormality occurrence.

Hitherto, a counter that counts a usage condition of a part is provided, and a part that is required to be replaced is identified in accordance with the count value. As another example, a failure notifying apparatus directly associated with a part is prepared, to thereby identify a part to be replaced.

In a case in which a part to be replaced is identified based on a count value, it is possible to determine whether the part is required to be replaced when the count value can be directly associated with the part to be replaced, like a regularly-consumed part that is required to be regularly replaced. However, it is difficult to determine whether a part not associated with a count value is required to be replaced. Further, in a case in which an unexpected abnormality not depending on a count value occurs, it is difficult to narrow down candidates for a part to be replaced. In a case in which a failure notifying apparatus is associated with a plurality of parts, it is difficult to determine which parts are candidates for a part to be replaced. For example, in a configuration in which one drive source is connected to a plurality of loads, it is not clear which one of the drive source and the plurality of loads is required to be replaced even when the drive source is associated with a failure notifying apparatus.

SUMMARY OF THE INVENTION

An information processing apparatus according to the present disclosure communicates with an image forming apparatus that forms an image on a sheet, and the image forming apparatus includes: a motor; a first load; a second load; a drive transmission mechanism configured to selectively transmit drive of the motor to the first load and the second load; and a control unit configured to control the drive transmission mechanism to transmit the drive of the motor to the first load so that the first load is driven, and to control the drive transmission mechanism to transmit the drive of the motor to the second load so that the second load is driven, the information processing apparatus comprising: an acquisition unit configured to acquire information related to an error that has occurred in the image forming apparatus, the information including timing information related to a time when the error occurs; a memory configured to store the information acquired by the acquisition unit; and a controller configured to: determine an error part in the image forming apparatus from among a plurality of candidates including the motor, the first load, and the second load, based on first timing information and second timing information, wherein the first timing information is included in the information in the memory and is related to a time when a first error of the first load occurred, and wherein the second timing information is included in the information in the memory and is related to a time when a second error of the second load occurred; and output a result of the determination of the error part.

Further features of the present invention will become apparent from the following description of exemplary embodiments (with reference to the attached drawings).

BRIEF DESCRIPTION OF THE DRAWINGS

FIG. 7A, FIG. 7B, FIG. 7C, and FIG. 7D are explanatory tables of a relationship between information at the time of error occurrence and a part to be replaced.

DESCRIPTION OF THE EMBODIMENTS

Now, referring to the accompanying drawings, description is given of an exemplary embodiment of the present disclosure.

<Configuration of Image Forming Apparatus>

Figure 1:
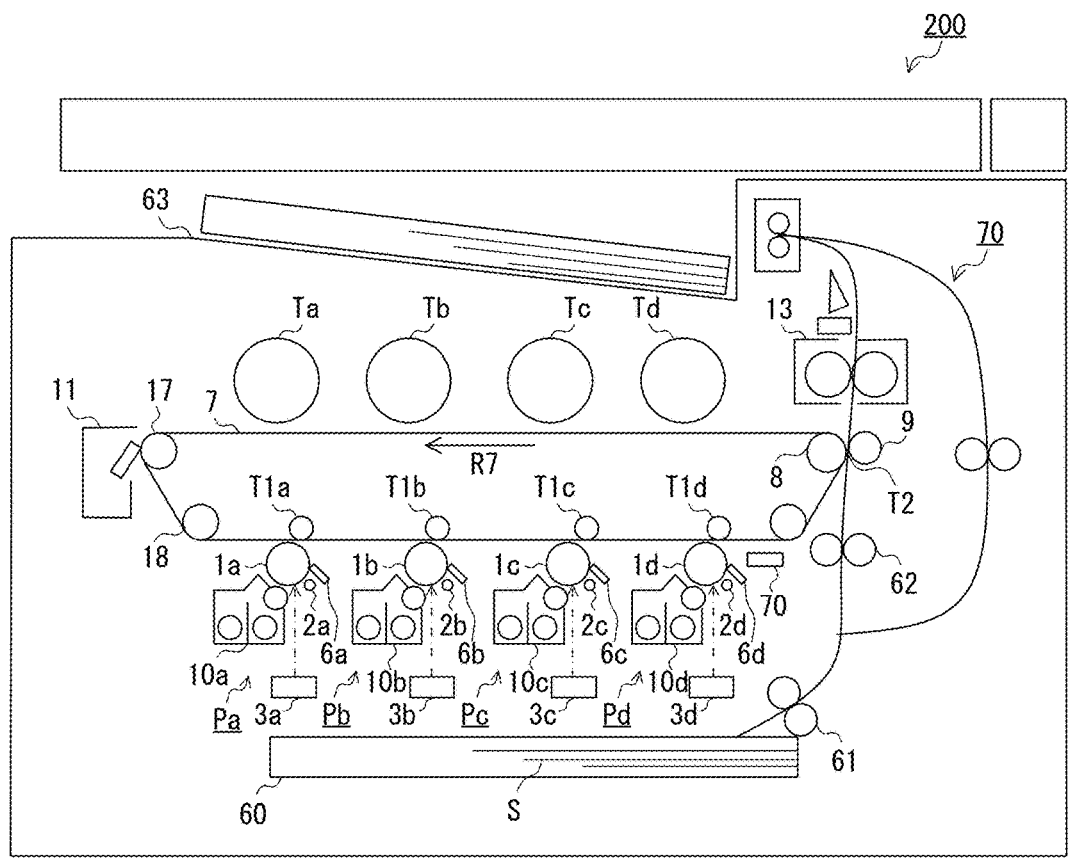
FIG. 1 is a configuration diagram of an image forming apparatus.

FIG. 1 is a configuration diagram of an image forming apparatus according to this embodiment. An image forming apparatus 200 according to this embodiment is a four-color full-color printer using electrophotography. The image forming apparatus 200 of FIG. 1 may be appropriately combined with another apparatus to be configured as a copying machine, a multi-function machine, or a facsimile machine.

The image forming apparatus 200 forms an image on a sheet S based on a print signal acquired from an external apparatus. The sheet S is a recording medium on which an image can be printed, and is, for example, plain paper, coated paper, an OHT sheet, a label, or the like. The image forming apparatus 200 converts the acquired print signal into image signals having been subjected to color separation into four colors of yellow (Y), magenta (M), cyan (C), and black (K). The image forming apparatus 200 charges a plurality of photosensitive members corresponding to the respective colors to a predetermined potential, and exposes the charged photosensitive members to light based on the image signals of the respective colors, to thereby form electrostatic latent images of colors corresponding to the respective photosensitive members. The image forming apparatus 200 develops the electrostatic latent images by using toners of the corresponding colors to form toner images on the respective photosensitive members, and transfers the toner images from the respective photosensitive members onto an intermediate transfer member by superimposing the toner images. The image forming apparatus 200 transfers the toner images from the intermediate transfer member onto the sheet S in a batch. The image forming apparatus 200 performs fixing processing by using thermocompression on the sheet S onto which the toner images have been transferred, and discharges the sheet S, as a printed product, to outside of the apparatus.

In order to perform the above-mentioned image forming processing, the image forming apparatus 200 includes parts such as image forming units Pa to Pd, an intermediate transfer belt 7 that is the intermediate transfer member, and a fixing device 13. The image forming apparatus 200 is a tandem intermediate transfer system in which the image forming units Pa to Pd are arranged along the intermediate transfer belt 7. The intermediate transfer belt 7 is provided in an intermediate transfer belt frame (not shown), and is an endless belt stretched by a plurality of rollers including a drive roller 18, a tension roller 17, and a secondary transfer inner roller 8. The intermediate transfer belt 7 is conveyed (rotated) in an R7 direction by the drive roller 18. The image forming units Pa to Pd form toner images of different colors, respectively. In this embodiment, the image forming unit Pa forms a yellow (Y) toner image. The image forming unit Pb forms a magenta (M) toner image. The image forming unit Pc forms a cyan (C) toner image. The image forming unit Pd forms a black (K) toner image.

The image forming units Pa to Pd are different from each other only in colors being used, and have similar configurations and perform similar operation. In the following, description is given of the image forming unit Pa that forms a yellow toner image, and description of the image forming units Pb to Pd is omitted. Further, in the following description, "a" to "d" at the ends of the reference symbols are omitted unless a color is required to be distinguished in the description.

The image forming unit Pa has a configuration in which a photosensitive drum 1a that is the photosensitive member is provided at the center, and a charging device 2a, an exposure device 3a, a developing device 10a, a primary transfer portion T1a, and a drum cleaner 6a are arranged around the photosensitive drum 1a.

The photosensitive drum 1a includes a grounded conductor element tube having a cylindrical shape on which a photosensitive layer is formed, and is driven to be rotated clockwise related to a drum shaft in the drawing. The charging device 2a has a shape of a roller, and includes an elastic layer formed around a conductive center shaft. The charging device 2a is urged toward the photosensitive drum 1a, to thereby rotate by following rotation of the photosensitive drum 1a while forming a nip between the charging device 2a and the photosensitive drum 1a. At that time, a charging bias is applied to the center shaft of the charging device 2a by a charging high-voltage power supply, and thus the charging device 2a uniformly charges the surface (photosensitive layer) of the photosensitive drum 1a to a predetermined potential.

The exposure device 3a is a laser scanner that performs scanning and exposure of laser light emitted from a laser emitting element on the photosensitive drum 1a in the drum shaft direction via a polygon mirror or an fθ optical system. The exposure device 3a modulates the laser light by using a drive signal generated based on an image signal. The modulated laser light is emitted to the photosensitive drum 1a. This causes a potential drop in a portion exposed to the laser light in the surface of the photosensitive drum 1a, and an electrostatic latent image corresponding to the image signal is formed on the surface of the photosensitive drum 1a.

The developing device 10a includes a stirring-conveying unit filled with a two-component developer composed of a magnetic carrier and a non-magnetic toner, a development sleeve, and a regulating member placed at a predetermined distance from the development sleeve. The development sleeve includes a conductive member provided around a fixedly-placed magnet roller. The developer is stirred and conveyed in the stirring conveyor, and thus a toner is charged with predetermined electric charge. The charged developer is borne and conveyed on the development sleeve by a magnetic force of the magnet roller and rotation of the development sleeve, and is adjusted to have a predetermined thickness by the regulating member. The developer having been adjusted to have the predetermined thickness on the development sleeve is supplied to the photosensitive drum 1a.

The supply of the developer to the photosensitive drum 1a is achieved by application of a development bias to the development sleeve by a development high-voltage power supply. When the development bias is applied to the development sleeve, an electromagnetic force is generated due to a potential difference between the electrostatic latent image formed on the photosensitive drum 1a and the development bias. By the electromagnetic force, the toner moves from the development sleeve to the photosensitive drum 1a. The toner having moved to the photosensitive drum 1a adheres to the electrostatic latent image and develops the electrostatic latent image into a toner image. In this embodiment, a toner having a negative polarity is used.

Meanwhile, in the developing device 10a, the stirring-conveying unit is repeatedly replenished with a yellow toner from a toner bottle Ta that is a replenishment container of the developer. This stabilizes an amount of a toner (toner density) in the developing device 10a to a predetermined reference amount. Thus, the developing device 10a can stabilize an amount of a toner that adheres to the photosensitive drum 1a. Likewise, a developing device 10b is replenished with a magenta toner from a toner bottle Tb. A developing device 10c is replenished with a cyan toner from a toner bottle Tc. A developing device 10d is replenished with a black toner from a toner bottle Td. In this embodiment, description is given of a two-component developer as an example, but the developer may be a one-component developer composed only of a magnetic toner or a non-magnetic toner. Also in the case of a one-component developer, the developing device 10 is replenished with a toner from a toner bottle T, and an amount of a toner contained (toner density) therein is stabilized to the predetermined reference amount.

The primary transfer portion T1a includes a primary transfer roller in a position at which the primary transfer roller faces the photosensitive drum 1a with the intermediate transfer belt 7 interposed. The primary transfer roller is urged toward the photosensitive drum 1a, to thereby form a primary transfer nip between the photosensitive drum 1a and the intermediate transfer belt 7. A primary transfer bias having a polarity opposite to that of the toner is applied to the primary transfer roller, and thus the toner image on the photosensitive drum 1a is transferred onto the intermediate transfer belt 7. A part of the toner that remains un-transferred on the photosensitive drum 1a at that time is collected by the drum cleaner 6a. The photosensitive drum 1a from which the remaining toner has been collected by the drum cleaner 6a is again used to form an image.

The image forming units Pb to Pd perform processing similar to that performed by the image forming unit Pa, to thereby form toner images of their corresponding colors on photosensitive drums 1b to 1d. A magenta toner image is formed on the photosensitive drum 1b. A cyan toner image is formed on the photosensitive drum 1c. A black toner image is formed on the photosensitive drum 1d. The intermediate transfer belt 7 is driven to be rotated at a surface speed substantially equal to that of the photosensitive drums 1a to 1d. The toner images of the respective colors formed by the image forming units Pa to Pd are superimposed and transferred while being aligned to each other on the intermediate transfer belt 7 in accordance with the rotation speed of the intermediate transfer belt 7.

The image forming apparatus 200 includes a sheet feeding cassette 60, a sheet feeding roller pair 61, a registration roller pair 62, and a secondary transfer outer roller 9 along a conveying path on which the sheet S is conveyed, in order to feed the sheet S on which an image is to be formed. The secondary transfer outer roller 9 forms a secondary transfer portion T2 together with the secondary transfer inner roller 8. The sheet feeding cassette 60 stores therein a pile of sheets S. The sheets S are separated by friction by the sheet feeding roller pair 61 synchronously with image formation by the image forming units Pa to Pd, and are fed and conveyed to the conveying path one by one. The sheet S is conveyed to the registration roller pair 62 via the conveying path. The registration roller pair 62 corrects a skew of the sheet S, and then conveys the sheet S to the secondary transfer portion T2 with adjusted timing.

In the secondary transfer portion T2, the secondary transfer outer roller 9 is urged toward the secondary transfer inner roller 8 with the intermediate transfer belt 7 interposed, to thereby form a secondary transfer nip between the secondary transfer portion T2 and the intermediate transfer belt 7. The secondary transfer outer roller 9 rotates by following rotation of the intermediate transfer belt 7. The sheet S supplied to the secondary transfer portion T2 is conveyed while being grasped by the secondary transfer nip. At that time, a secondary transfer bias having a polarity opposite to that of the toner is applied to the secondary transfer outer roller 9, and thus the toner image on the intermediate transfer belt 7 is transferred onto the sheet S. A part of the toner that remains un-transferred on the intermediate transfer belt 7 is collected by a belt cleaner 11 placed so as to face the tension roller 17 with the intermediate transfer belt 7 interposed. The intermediate transfer belt 7 from which the remaining toner has been collected by the belt cleaner 11 is again used to form an image.

The sheet S onto which the toner image has been transferred is conveyed to the fixing device 13 by the secondary transfer outer roller 9. The fixing device 13 includes a roller pair having a built-in heater, and melts the toner image to fix the toner image onto the sheet S by thermocompression. The multi-color toner image produces colors during the melting fixation to be a full-color image. The fixing device 13 includes a heater serving as a heat source and is controlled such that an optimum temperature (fixation temperature) is always kept. The sheet S onto which the full-color image has been fixed is discharged onto a sheet discharge tray 63, as a printed product.

In the case of double-side printing, the sheet S in which an image has been printed on one of both surfaces is conveyed to the registration roller pair 62 by a reversing conveying mechanism 70. At that time, a surface of the sheet S on which an image is to be printed is reversed. As a result of the reversal, in the sheet S conveyed from the registration roller pair 62 to the secondary transfer portion T2, an image is formed on the other of the surfaces. In this manner, the image forming apparatus 200 can form an image based on a print signal on a sheet.

<Control Unit>

Figure 2:
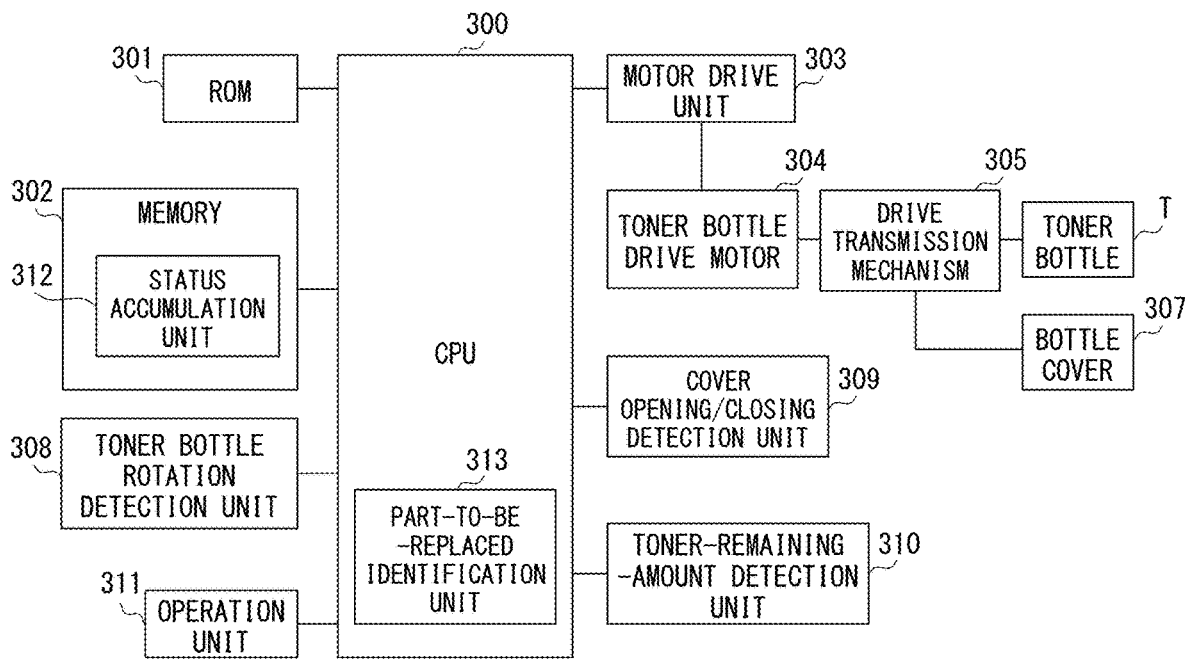
FIG. 2 is a configuration diagram of a control unit.

FIG. 2 is a configuration diagram of a control unit that controls operation of the image forming apparatus 200. The control unit is an information processing apparatus including a central processing unit (CPU) 300, a read-only memory (ROM) 301, and a memory 302. Further, the control unit includes a motor drive unit 303, a toner bottle rotation detection unit 308, a cover opening/closing detection unit 309, a toner-remaining-amount detection unit 310, and an operation unit 311, which are connected to the CPU 300. The motor driver 303 is connected to a toner bottle drive motor 304. The toner bottle drive motor 304 is connected to the toner bottle T (first load) and a bottle cover 307 (second load). The bottle cover 307 is an openable/closable cover for preventing the toner bottle T from being touched externally at any time other than the time of replacement.

The CPU 300 is a controller that controls operation of each part of the image forming apparatus 200 by execution of a computer program stored in the ROM 301. Further, the CPU 300 has a function of identifying a part to be replaced at the time of error occurrence. To this end, the CPU 300 includes a part-to-be-replaced identification unit 313. The memory 302 is a working memory used by the CPU 300 in performing processing. Further, the memory 302 can hold data with a battery (not shown) also in a power-off state of the image forming apparatus 200. The memory 302 is provided with a status accumulation unit 312 that is a storage area in which information at the time of error occurrence is stored.

The motor drive unit 303 drives the toner bottle drive motor 304 under the control of the CPU 300. The toner bottle drive motor 304 is a drive source for exclusively driving the toner bottle T and the bottle cover 307. The toner bottle drive motor 304 is connected to the toner bottle T and the bottle cover 307 via a drive transmission mechanism 305 including a plurality of gears. To connect the drive transmission mechanism 305 to any one of the toner bottle T or the bottle cover 307 allows a driving force from the toner bottle drive motor 304 to be selectively transmitted to the toner bottle T and the bottle cover 307. The CPU 300 determines which of the toner bottle T and the bottle cover 307 is driven by the toner bottle drive motor 304. The CPU 300 functions as a controller (control unit) that controls drive of the toner bottle drive motor 304 to be transmitted to the toner bottle T so that the toner bottle T is driven, and controls drive of the toner bottle drive motor 304 to be transmitted to the bottle cover 307 so that the bottle cover 307 is driven.

The toner bottle drive motor 304 drives the toner bottle T to rotate when the toner bottle drive motor 304 is driven by the motor drive unit 303 under a state in which the drive transmission mechanism 305 is connected to the toner bottle T. The rotation of the toner bottle T causes a toner to be supplied from the toner bottle T to the developing device 10.

The toner bottle drive motor 304 drives the bottle cover 307 when the toner bottle drive motor 304 is driven by the motor drive unit 303 under a state in which the drive transmission mechanism 305 is connected to the bottle cover 307. When the toner bottle T is replaced, the motor driver 303 can open and close the bottle cover 307 without rotating the toner bottle T under the control of the CPU 300.

Further, the image forming apparatus 200 has been described as having a configuration in which the drive transmission mechanism 305 is connected to any one of the toner bottle T or the bottle cover 307, but the image forming apparatus 200 is not limited to this configuration. For example, the image forming apparatus 200 may have a configuration in which drive is transmitted to the toner bottle T when the toner bottle drive motor 304 rotates in a first rotation direction and drive is transmitted to the bottle cover 307 when the toner bottle drive motor 304 rotates in a second rotation direction opposite to the first rotation direction.

The toner bottle rotation detection unit 308 detects whether the toner bottle T is rotating, and notifies the result of the detection to the CPU 300. The cover opening/closing detection unit 309 detects whether the bottle cover 307 is opened or closed, and notifies the result of the detection to the CPU 300. The toner-remaining-amount detection unit 310 detects a remaining amount of a toner in the toner bottle T, and notifies the result of the detection to the CPU 300.

The operation unit 311 is a user interface including an input interface and an output interface. The input interface is a key button, a touch panel, or the like. The output interface is a display, a speaker, or the like. The operation unit 311 displays an image on a display under the control of the CPU 300. For example, the operation unit 311 displays an error on the display under the control of the CPU 300. A user can use the input interface of the operation unit 311 to issue an instruction indicating a start of the maintenance work of the image forming apparatus 200. When an instruction indicating the start of the maintenance work is issued via the input interface, the operation unit 311 notifies the start of the maintenance work to the CPU 300.

<Toner Bottle>

Figure 3A:
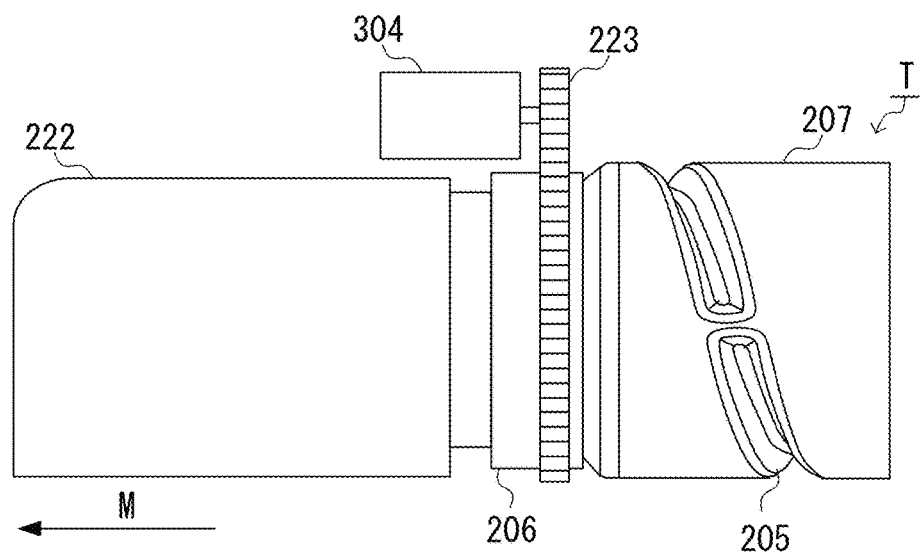
FIG. 3A, FIG. 3B, and FIG. 3C are explanatory views of a toner bottle.
Figure 3B:
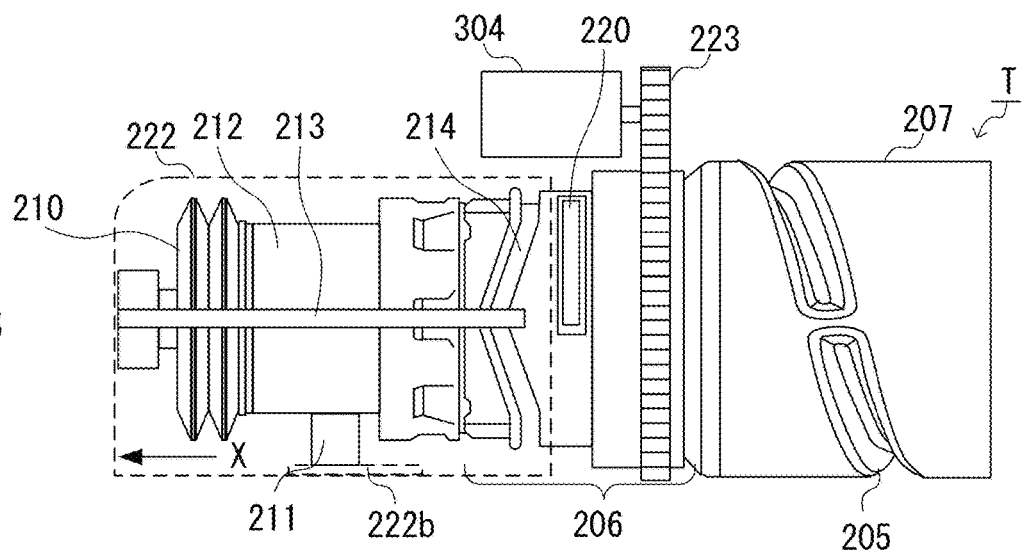
Figure 3C:
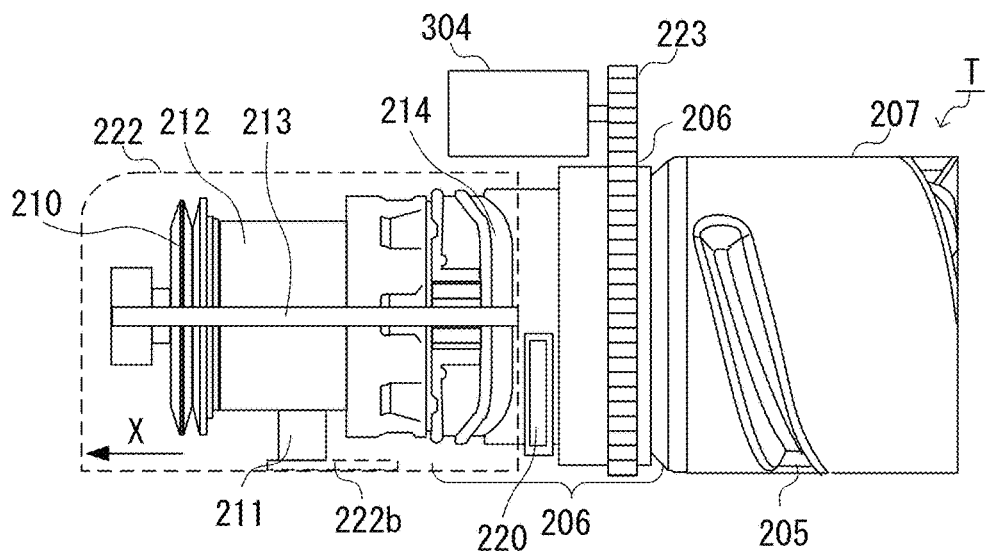

FIG. 3A, FIG. 3B, and FIG. 3C are explanatory views of the toner bottle T. FIG. 3A is an external view of the toner bottle T. FIG. 3B and FIG. 3C are explanatory views of an internal structure of the toner bottle T. The toner bottle T includes an accommodating portion 207 accommodating a toner, a drive transmission portion 206 to which a rotation driving force is transmitted from the toner bottle drive motor 304 via a drive gear 223, and a cap portion 222 including a structure that discharges a toner. The accommodating portion 207 and the cap portion 222 communicate with each other via the drive transmission portion 206.

In the accommodating portion 207, a recessed portion 205 protruding inwardly is formed. The recessed portion 205 is formed in a spiral shape in an outer surface of the accommodating portion 207. The recessed portion 205 conveys a toner in the accommodating portion 207 toward a discharge portion 212 in response to rotation of the accommodating portion 207. The accommodating portion 207 and the drive transmission portion 206 are coupled to each other, and hence rotation of the drive transmission portion 206 causes also the accommodating portion 207 to rotate together therewith. The cap portion 222 includes the discharge portion 212 including a discharge port 211 through which a toner is discharged, a pump portion 210 for discharging a toner in the discharge portion 212 through the discharge port 211, and a reciprocating member 213 that expands and compresses the pump portion 210.

The drive transmission portion 206 includes a protruding portion 220 and a cam groove 214. The cam groove 214 is formed over the circumference of the drive transmission portion 206 so as to extend in the rotation direction of the drive transmission portion 206. The cam groove 214 and the protruding portion 220 are formed integrally with each other, and rotate together with each other as the drive transmission portion 206. By a rotation driving force transmitted to the drive transmission portion 206 of the toner bottle T from the toner bottle drive motor 304 via the drive gear 223, the drive transmission portion 206 and the accommodating portion 207 coupled to the drive transmission portion 206 rotate.

The cap portion 222 is regulated not to rotate, and hence the cap portion 222 does not rotate by following the drive transmission portion 206 even when the drive transmission portion 206 rotates when mounted. Also the discharge port 211, the pump portion 210, and the reciprocating member 213, like the cap portion 222, are regulated not to rotate. Thus, rotation of the drive transmission portion 206 does not cause the discharge port 211, the pump portion 210, and the reciprocating member 213 to rotate.

On the inner side of the cap portion 222, a rotation regulating groove is formed. The rotation regulating groove regulates rotation of the reciprocating member 213 at the time of rotation of the drive transmission portion 206. Thus, the reciprocating member 213 is engaged with the rotation regulating groove when the drive transmission portion 206 rotates. The reciprocating member 213 is connected to the pump portion 210, and a nail portion thereof (not shown) is engaged with the cam groove 214 of the drive transmission portion 206. When the drive transmission portion 206 rotates, the reciprocating member 213 moves along the cam groove 214 while being regulated not to rotate. In this manner, the reciprocating member 213 reciprocates in a direction of an arrow X (the longitudinal direction of the toner bottle T).

The reciprocating member 213 is coupled to the pump portion 210. Reciprocation of the reciprocating member 213 causes the pump portion 210 to be repeatedly expanded and compressed. Specifically, when the reciprocating member 213 moves in the direction of the arrow X, the pump portion 210 is expanded. The expansion of the pump portion 210 reduces the internal pressure of the toner bottle T, and air is sucked through the discharge port 211 so that a toner in the discharge portion 212 is loosened. When the reciprocating member 213 moves in a direction opposite to the direction of the arrow X, the pump portion 210 is compressed. The compression of the pump portion 210 increases the internal pressure of the toner bottle T, and a toner deposited at the discharge port 211 is supplied to the developing device 10 from the discharge port 211. That is, the toner bottle drive motor 304 functions as a drive source that expands and compresses the pump portion 210 by rotating the toner bottle T being mounted.

The cap portion 222 includes a sealing member 222b for sealing the discharge port 211. To seal the discharge port 211 with the sealing member 222b can prevent a toner in the toner bottle T from leaking out through the discharge port 211. The sealing member 222b is removed when the toner bottle T is mounted in the image forming apparatus 200. As a result of removal of the sealing member 222b, the discharge port 211 of the toner bottle T is opened.

FIG. 3B shows a state in which the pump portion 210 of the toner bottle T is expanded as much as possible. FIG. 3C shows a state in which the pump portion 210 of the toner bottle T is compressed as much as possible. The pump portion 210 is a bellows pump that is made of a resin and has a volume that can vary with expansion and compression. Specifically, the pump portion 210 is formed of arrangement of a "mountain-fold" portion and a "valley-fold" portion alternating repeatedly along the longitudinal direction of the toner bottle T.

In the cam groove 214, two peaks and two valleys are formed in the order of a valley, a peak, a valley, and a peak. During a change in a position at which the reciprocating member 213 is engaged with the cam groove 214 from a valley to a peak, the pump portion 210 is expanded as much as possible. During a change in a position at which the reciprocating member 213 is engaged with the cam groove 214 from a peak to a valley, the pump portion 210 is compressed as much as possible. When a position at which the reciprocating member 213 is engaged with the cam groove 214 is a valley, the pump portion 210 is kept compressed as much as possible. Because of the above-mentioned configuration, in this embodiment, operation of supplying a toner is performed twice while the toner bottle T rotates once. Single operation of supplying a toner starts under a state in which the pump portion 210 is compressed as much as possible and ends under a state in which the pump portion 210 is again compressed as much as possible after being expanded and compressed.

<Toner-Remaining-Amount Detection Unit>

Figure 4:
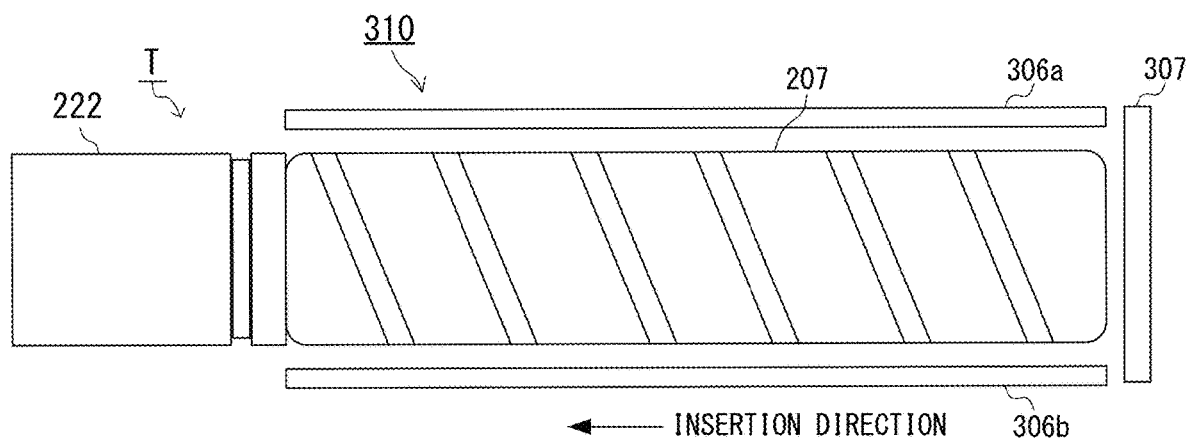
FIG. 4 is an explanatory view of a toner-remaining-amount detection unit.

FIG. 4 is an explanatory view of the toner-remaining-amount detection unit 310. Description is given here of the toner-remaining-amount detection unit 310 that is of a capacitance type, but any type that can detect a remaining amount of a toner in the toner bottle T can be adopted. The bottle cover 307 is placed in the rear with respect to a direction in which the toner bottle T is inserted. In replacing the toner bottle T, the bottle cover 307 is opened and closed.

The toner-remaining-amount detection unit 310 includes two detection electrodes 306a and 306b provided near the toner bottle T. The two detection electrodes 306a and 306b are placed such that the entire accommodating portion 207 of the toner bottle T is interposed therebetween. The detection electrodes 306a and 306b function as capacitors and have capacitance corresponding to a remaining amount of a toner in the toner bottle T. When a voltage is applied to the detection electrodes 306a and 306b, electric charges corresponding to the capacitance are accumulated. The CPU 300 acquires a voltage corresponding to the electric charges accumulated in the detection electrodes 306a and 306b as a detection signal. The CPU 300 can detect a remaining amount of a toner in the toner bottle T based on the acquired detection signal.

<Toner bottle Rotation Detection Unit>

Figure 5A:
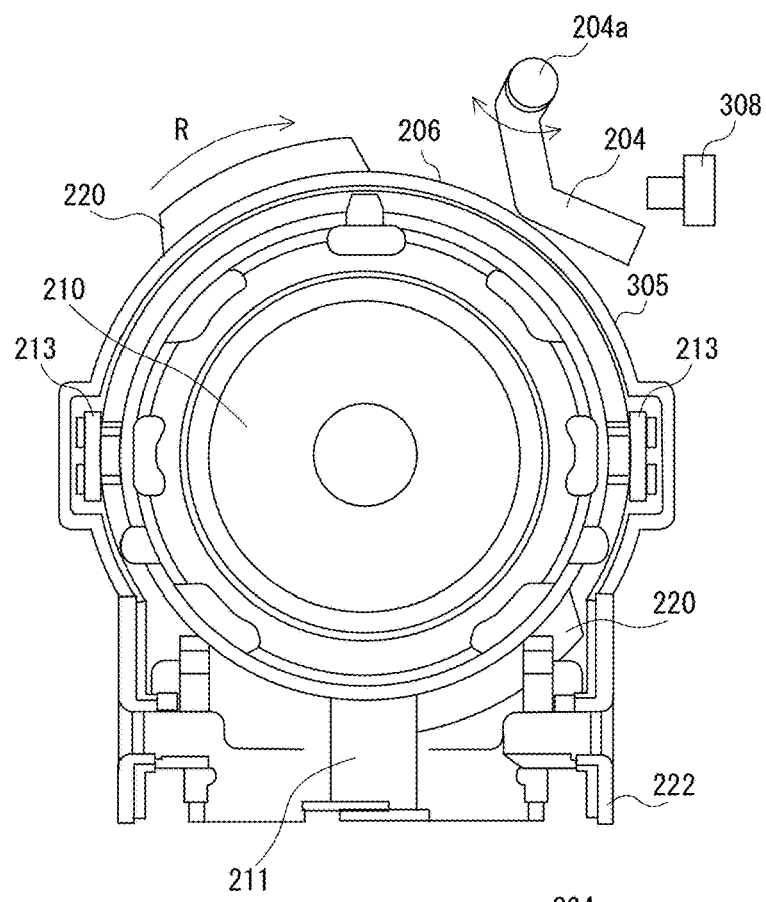
FIG. 5A and FIG. 5B are explanatory views of a toner bottle rotation detection unit.
Figure 5B:
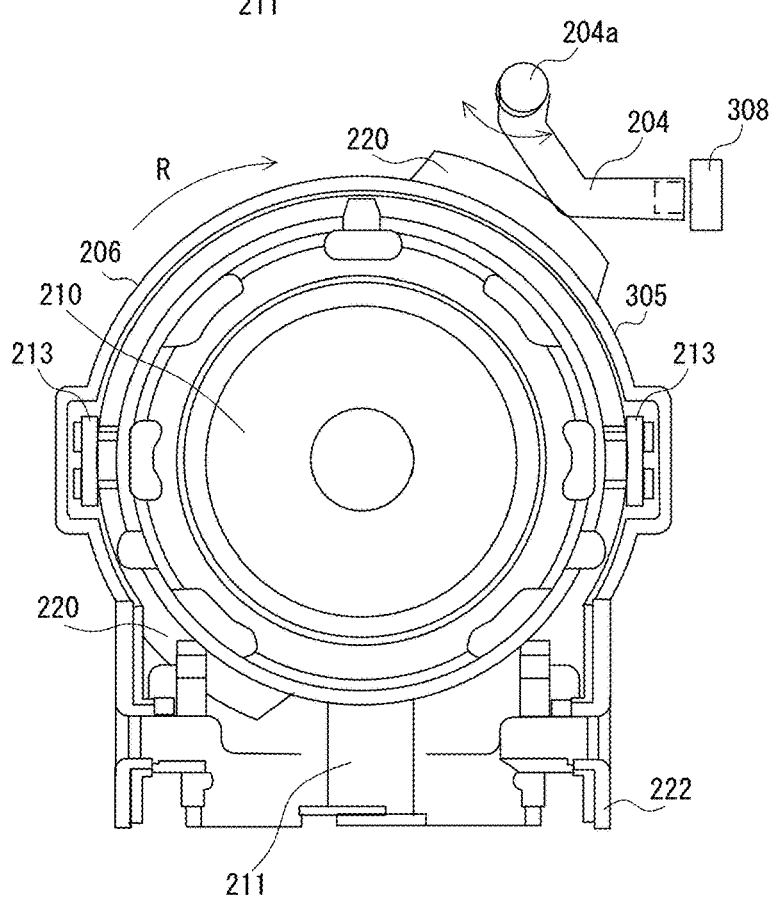

FIG. 5A and FIG. 5B are explanatory views of the toner bottle rotation detection unit 308. The toner bottle rotation detection unit 308 in this embodiment is an optical sensor including a light emitter and a light receiver that receives light emitted from the light emitter, for example. The toner bottle rotation detection unit 308 detects rotation of the toner bottle T based on a change in a light reception state of the light receiver, which is made by a flag 204 provided near the toner bottle T.

The flag 204 is an L-shaped bent member that swings around a rotation shaft 204a. In the flag 204, a bent portion is brought into contact with the drive transmission portion 206 of the toner bottle T due to its own weight. The flag 204 swings around the rotation shaft 204a when the flag 204 is brought into contact with the protruding portion 220 of the drive transmission portion 206. This causes a free end that is a tip end of the flag 204 to be brought into contact with the toner bottle rotation detection unit 308. In this state, light from the light emitter of the toner bottle rotation detection unit 308 is blocked and is not received by the light receiver. In a case in which the flag 204 is not brought into contact with the protruding portion 220 of the drive transmission portion 206, light from the light emitter of the toner bottle rotation detection unit 308 is received by the light receiver without being blocked.

In this manner, the toner bottle rotation detection unit 308 can detect whether the flag 204 is in contact with the protruding portion 220. The toner bottle rotation detection unit 308 can detect a rotation phase (rotation angle) of the toner bottle T by detecting contact between the flag 204 and the protruding portion 220. Specifically, the toner bottle rotation detection unit 308 can detect a rotation phase of the toner bottle T by detecting a position at which the protruding portion 220 of the toner bottle T is in contact with the flag 204.

FIG. 5A shows a state in which the flag 204 is in contact with the drive transmission portion 206. In this case, the flag 204 does not block light from the light emitter of the toner bottle rotation detection unit 308. Thus, the light receiver receives light emitted from the light emitter. An amount of light received by the light receiver is equal to or larger than a threshold value. The toner bottle rotation detection unit 308 outputs a high-level (H) signal because the amount of light received by the light receiver is equal to or larger than the threshold value. That is, the toner bottle rotation detection unit 308 transmits a high-level signal to the CPU 300 while the flag 204 is in contact with the drive transmission portion 206.

FIG. 5B shows a state in which the flag 204 is in contact with the protruding portion 220. In this case, the flag 204 blocks light from the light emitter of the toner bottle rotation detection unit 308. Thus, the light receiver does not receive light emitted from the light emitter. An amount of light received by the light receiver is smaller than the threshold value. The toner bottle rotation detection unit 308 outputs a low-level (L) signal because the amount of light received by the light receiver is smaller than the threshold value. That is, the toner bottle rotation detection unit 308 transmits a low-level signal to the CPU 300 while the flag 204 is in contact with the protruding portion 220.

The CPU 300 detects a position of the protruding portion 220 based on a level of a signal acquired from the toner bottle rotation detection unit 308. As a result, the CPU 300 can detect a rotation phase of the toner bottle T. After the signal output from the toner bottle rotation detection unit 308 changes from a low level to a high level, the pump portion 210 of the toner bottle T starts being expanded. While the signal output from the toner bottle rotation detection unit 308 is kept at a high level, the pump portion 210 undergoes a maximum expansion state and starts being compressed. Before the signal output from the toner bottle rotation detection unit 308 changes from a high level to a low level, the pump portion 210 is placed into a maximum compression state. That is, while the flag 204 is in contact with the drive transmission portion 206, the pump portion 210 is compressed and supplies a toner to the developing device 10.

<Toner Replenishing Processing and Toner bottle Replacement Processing>

Figure 6A:
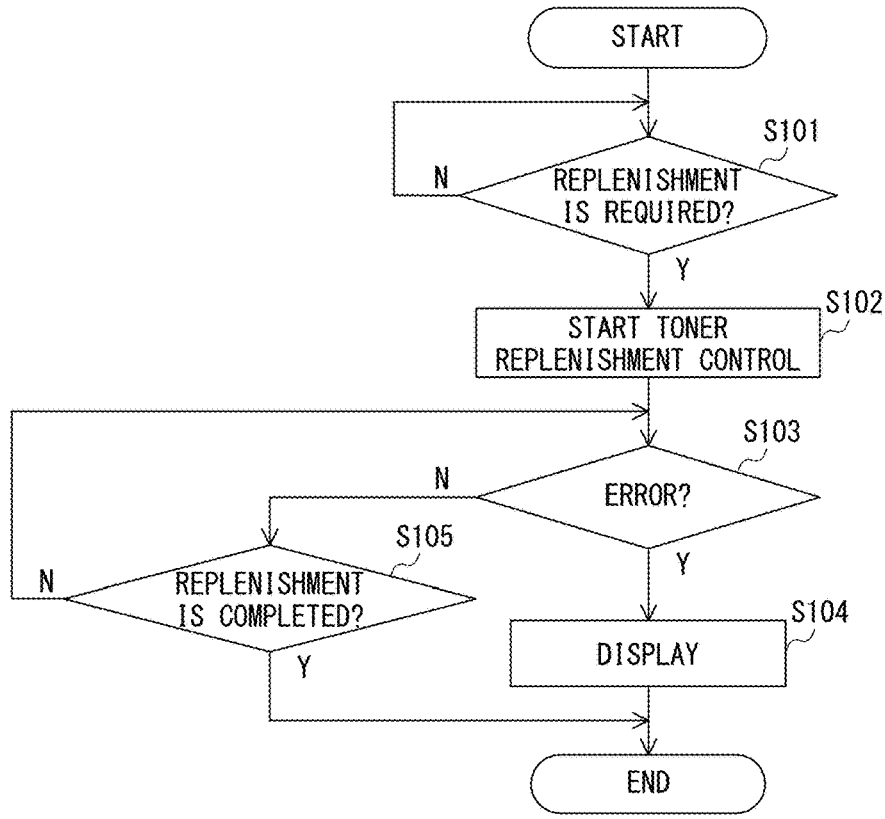
FIG. 6A and FIG. 6B are explanatory charts of toner replenishment processing and processing of replacing a toner bottle.
Figure 6B:
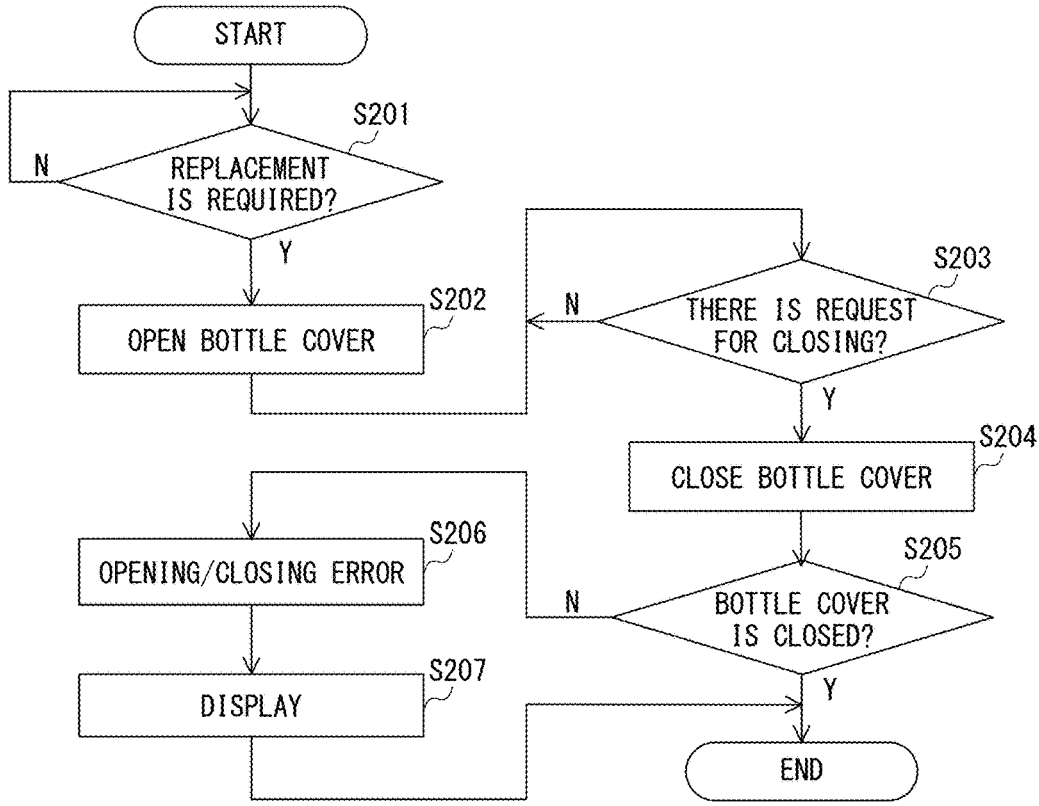

FIG. 6A and FIG. 6B are explanatory charts of toner replenishing processing and processing of replacing the toner bottle T. FIG. 6A is a flowchart for illustrating the toner replenishing processing. FIG. 6B is a flowchart for illustrating the processing of replacing the toner bottle T.

First, the toner replenishing processing is described. The CPU 300 determines whether it is required to supply a toner based on an amount of a toner in the developing device 10 (Step S101). The amount of the toner in the developing device 10 is detected by a sensor (not shown) provided in the developing device 10. When it is not required to supply a toner (Step S101: N), the CPU 300 continues to perform processing of determining whether it is required to supply a toner. When it is required to supply a toner (Step S101: Y), the CPU 300 starts toner replenishment control (Step S102).

The CPU 300, which has started toner replenishment control, drives and controls the toner bottle drive motor 304 by using the motor drive unit 303, to thereby perform the toner replenishment processing as described with reference to FIG. 3A, FIG. 3B, and FIG. 3C. At the same time, the CPU 300 monitors whether the toner bottle T rotates in a predetermined manner, based on a detection result of the toner bottle rotation detection unit 308. In this manner, the CPU 300 determines whether a rotation error of the toner bottle T occurs (Step S103).

When it is determined that no rotation error of the toner bottle T occurs (Step S103: N), the CPU 300 monitors rotation of the toner bottle T until the toner replenishment is completed (Step S105: N). Completion of the toner replenishment is determined when the amount of the toner in the developing device 10 becomes equal to or larger than a predetermined amount, for example. When the toner replenishment is completed (Step S105: Y), the CPU 300 ends the toner replenishment processing.

When it is determined that a rotation error (abnormality) of the toner bottle T occurs (Step S103: Y), the CPU 300 displays the occurrence of the rotation error (toner bottle rotation error) on the operation unit 311, to thereby notify the occurrence of the rotation error to a user (Step S104). Further, the CPU 300 stores information related to the rotation error having occurred into the status accumulation unit 312 in the memory 302. Then, the CPU 300 ends the toner replenishment processing.

Next, the toner bottle replacement processing is described. The CPU 300 determines whether it is required to replace the toner bottle T depending on whether the amount of the toner in the developing device 10 is increased by the toner replenishment processing (FIG. 6A) (Step S201). When the amount of toner in the developing device 10 is increased (Step S201: N), the CPU 300 monitors an increase of the amount of the toner in the developing device 10 until the toner replenishment processing is completed.

When the amount of the toner in the developing device 10 is not increased (Step S201: Y), the CPU 300 determines that no toner remains in the toner bottle T itself. In this case, the CPU 300 determines that it is required to replace the toner bottle T, and displays a replacement instruction screen for the toner bottle T on the operation unit 311, to thereby urge the user to replace the toner bottle T. In the replacement instruction screen, a bottle replacement button and a "CLOSE BOTTLE COVER" button described later are displayed and can be selected (pressed down) through the operation unit 311.

The user replaces the toner bottle T in response to the display on the operation unit 311. To this end, the user presses down the bottle replacement button displayed on the operation unit 311. The CPU 300 acquires information indicating the press-down of the bottle replacement button from the operation unit 311, and then drives and controls the toner bottle drive motor 304 by using the motor drive unit 303, to thereby open the bottle cover 307 (Step S202). The cover opening/closing detection unit 309 starts detecting whether the bottle cover 307 is properly opened in response to the press-down of the bottle replacement button. The CPU 300 can check whether the bottle cover 307 is properly opened based on the detection result of the cover opening/closing detection unit 309.

When the replacement of the toner bottle T ends, the user inputs a request for closing the bottle cover 307 by using the operation unit 311. To this end, the CPU 300 waits for an input of a request for closing from the operation unit 311 (Step S203: N) after opening the bottle cover 307. The request for closing the bottle cover 307 is input by press-down of the "CLOSE BOTTLE COVER" button displayed on the operation unit 311, for example.

When the request for closing the bottle cover 307 is acquired (Step S203: Y), the CPU 300 closes the bottle cover 307 by using the motor drive unit 303 (Step S204). The CPU 300 checks whether the bottle cover 307 is properly closed based on the detection result of the cover opening/closing detection unit 309 (Step S205). When the bottle cover 307 is properly closed (Step S205: Y), the CPU 300 ends the toner bottle replacement processing.

When the bottle cover 307 is not properly closed (Step S205: N), the CPU 300 determines that an opening/closing error (abnormality) of the bottle cover 307 occurs (Step S206). The CPU 300 determines whether the bottle cover 307 is properly opened also when opening the bottle cover 307, to thereby determine whether an opening/closing error of the bottle cover 307 occurs. Thus, in the processing step of Step S206, it is also determined whether an opening/closing error occurs during an open state. The CPU 300 displays the occurrence of the opening/closing error (bottle cover opening/closing error) of the bottle cover 307 on the operation unit 311, to thereby notify the occurrence of the opening/closing error to the user (Step S207). Further, the CPU 300 stores information related to the bottle cover opening/closing error having occurred into the status accumulation unit 312 in the memory 302. Then, the CPU 300 ends the toner bottle replacement processing.

<Part Replacement>

FIG. 7A, FIG. 7B, FIG. 7C, and FIG. 7D are explanatory tables of a relationship between information at the time of error occurrence and a part to be replaced. FIG. 7A, FIG. 7B, and FIG. 7C show examples of logs of information at the time of error occurrence stored in the status accumulation unit 312 in the memory 302 by the processing of FIG. 6A and FIG. 6B. A log of information at the time of error occurrence includes an ID 601, an occurrence date/time 602, the cumulative number 603 of pages at the time of error occurrence, and an occurring error 604 indicating details of an error having occurred. The ID 601 identifies an error (abnormality) having occurred. The occurrence date/time 602 indicates a date and time when occurrence of a corresponding error is detected. The cumulative number 603 of pages is the number of times (job count value) the image forming apparatus 200 has formed images, at the time when occurrence of a corresponding error is detected. Both of the occurrence date/time 602 and the cumulative number 603 of pages are timing information regarding a time when an error occurs. The occurring error 604 is any one of a rotation error of the toner bottle T or an opening/closing error of the bottle cover 307 in this embodiment.

FIG. 7D is a table that manages parts to be replaced that are associated with errors having occurred. In a case in which a part to be replaced includes a plurality of parts combined with each other, the table manages also a pattern of parts to be replaced (replacement pattern) in the part to be replaced. Here, a part 611 to be replaced is managed in association with a part-to-be-replaced pattern 610. A plurality of replacement patterns are set in association with one error. This table is stored in the memory 302, for example.

Figure 8:
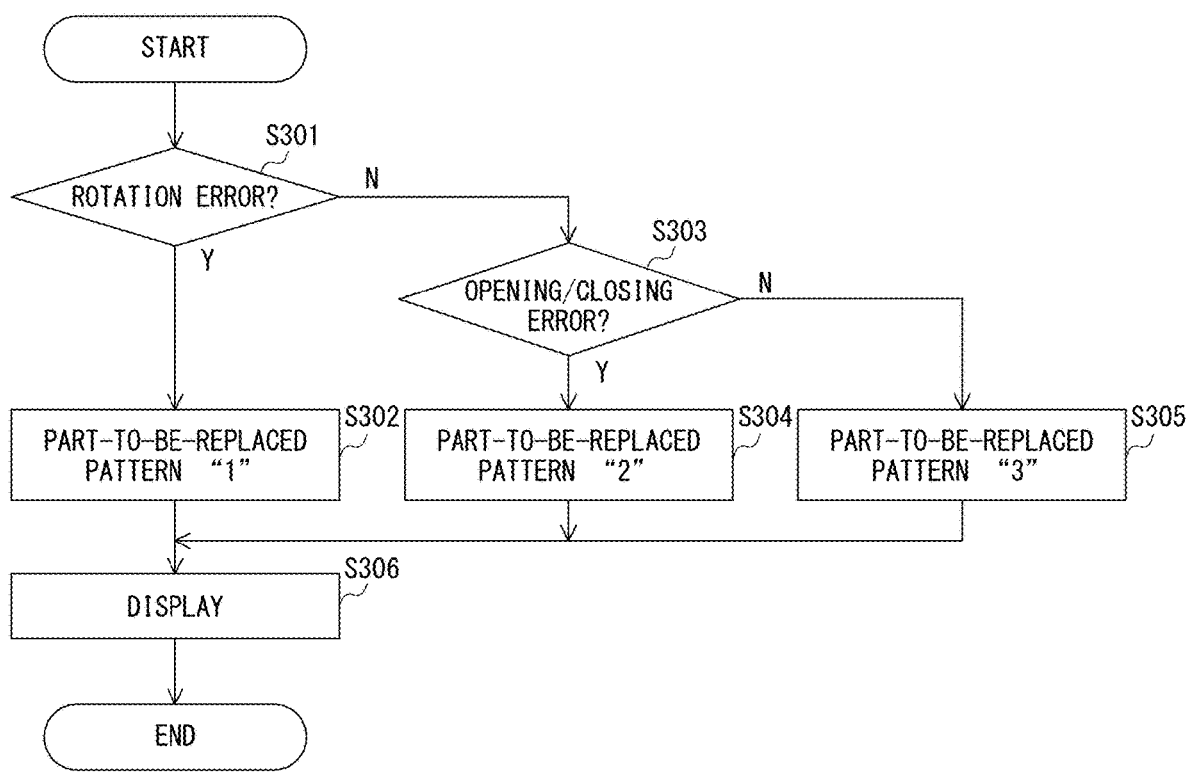
FIG. 8 is a flowchart for illustrating processing of identifying a part to be replaced.

The CPU 300 refers to those logs and the table, to thereby identify a part that causes an error when the error occurs. The CPU 300 notifies the identified part to the user as a part to be replaced that is required to be replaced, by using the operation unit 311. Specific processing is described with reference to FIG. 7A, FIG. 7B, FIG. 7C, FIG. 7D, and FIG. 8. FIG. 8 is a flowchart for illustrating processing of identifying a part to be replaced. The CPU 300 performs the processing of identifying a part to be replaced by using the part-to-be-replaced identification unit 313.

Description is given of a case in which a bottle cover opening/closing error occurs and the occurrence date/time 602 of FIG. 7A is "2021/6/15 13:02." The part-to-be-replaced identification unit 313 of the CPU 300 performs analysis to find which part in the image forming apparatus 200 is to be replaced, while referring to the past logs of FIG. 7A. A cause of occurrence of a bottle cover opening/closing error lies in any of the toner bottle drive motor 304, the bottle cover 307, and the cover opening/closing detection unit 309, which are used for opening and closing the bottle cover 307. By the analysis, which part is to be replaced is identified.

The part-to-be-replaced identification unit 313 checks whether a toner bottle rotation error has occurred in a predetermined period before the time when the bottle cover opening/closing error occurs, namely, "2021/6/15 13:02" (Step S301). The part-to-be-replaced identification unit 313 performs this processing by referring to the logs stored in the status accumulation unit 312. The predetermined period is determined based on timing information or the cumulative number 603 of pages (job count). For example, in a case in which the timing information is used, the predetermined period is determined such that the occurrence date/time 602 is within one hour before the time of the latest error occurrence. In a case in which the cumulative number 603 of pages is used, the predetermined period is determined such that a difference from the cumulative number 603 of pages at the time of the latest error occurrence is equal to or less than 1,000.

In FIG. 7A, as shown in the rows of an ID "100" and an ID "101," a toner bottle rotation error occurs in the predetermined period (Step S301: Y). The toner bottle rotation error has occurred before occurrence of the bottle cover opening/closing error, and hence it can be deduced that a part to be replaced (error part) is the toner bottle drive motor 304. Thus, the part 611 to be replaced is a part-to-be-replaced pattern "1." The part-to-be-replaced identification unit 313 determines that the part 611 to be replaced is the part-to-be-replaced pattern "1" (Step S302). When a difference between the occurrence date (time) of the toner bottle rotation error and the occurrence date (time) of the bottle cover opening/closing error is one hour, the part-to-be-replaced identification unit 313 determines that an error part (error site) is the toner bottle drive motor 304.

The CPU 300 displays the part to be replaced that is associated with the part-to-be-replaced pattern "1" in FIG. 7D, on the operation unit 311 (Step S306). Then, the part-to-be-replaced identification processing ends.

Description is given of a case in which a bottle cover opening/closing error occurs and the occurrence date/time 602 of FIG. 7B is "2021/7/15 13:02." The part-to-be-replaced identification unit 313 of the CPU 300 performs analysis to find which part in the image forming apparatus 200 is to be replaced, while referring to the past logs of FIG. 7B.

The part-to-be-replaced identification unit 313 checks whether a toner bottle rotation error has occurred in a predetermined period before the time when the bottle cover opening/closing error occurs, namely, "2021/7/15 13:02" (Step S301). The part-to-be-replaced identification unit 313 performs this processing by referring to the logs stored in the status accumulation unit 312. The predetermined period is as described above.

In FIG. 7B, no toner bottle rotation error occurs in the predetermine period (Step S301: N). Thus, the part-to-be-replaced identification unit 313 checks whether another bottle cover opening/closing error has occurred in the predetermined period before the time when the bottle cover opening/closing error occurs, namely, "2021/7/15 13:02" (Step S303). The part-to-be-replaced identification unit 313 performs this processing by referring to the logs stored in the status accumulation unit 312. The predetermined period is as described above.

In FIG. 7B, as shown in the rows of an ID "200" and an ID "201," a bottle cover opening/closing error occurs in the predetermined period (Step S303: Y). The bottle cover opening/closing error has occurred without occurrence of any toner bottle rotation error, and hence it can be deduced that a part to be replaced is the bottle cover 307 or the cover opening/closing detection unit 309. Thus, the part 611 to be replaced is a part-to-be-replaced pattern "2." The part-to-be-replaced identification unit 313 determines that the part 611 to be replaced is the part-to-be-replaced pattern "2" (Step S304). For example, when a difference between the occurrence date (time) of the toner bottle rotation error and the occurrence date (time) of the bottle cover opening/closing error is more than one hour, the part-to-be-replaced identification unit 313 determines that an error part is the bottle cover 307 or the cover opening/closing detection unit 309.

The CPU 300 displays the parts to be replaced that are associated with the part-to-be-replaced pattern "2" in FIG. 7D, on the operation unit 311 (Step S306). Then, the part-to-be-replaced identification processing ends.

Description is given of a case in which a bottle cover opening/closing error occurs and the occurrence date/time 602 of FIG. 7C is "2021/7/25 13:02." The processing steps up to Step S303 are similar to those in the case in which a bottle cover opening/closing error occurs and the occurrence date/time 602 of FIG. 7B is "2021/7/15 13:02." In FIG. 7C, as shown in the rows of an ID "300" and an ID "301," no bottle cover opening/closing error occurs in the predetermined period (Step S303: N). Thus, the part-to-be-replaced identification unit 313 determines that the part 611 to be replaced is a part-to-be-replaced pattern "3" (Step S305). This is because no error occurs at a predetermined time before occurrence of the bottle cover opening/closing error and hence the part 611 to be replaced cannot be identified. For example, in a case in which no error occurs within one hour before the occurrence date (time) of the bottle cover opening/closing error, the part-to-be-replaced identification unit 313 determines that an error part is the toner bottle drive motor 304, the bottle cover 307, or the cover opening/closing detection unit 309. The CPU 300 displays the parts to be replaced that are associated with the part-to-be-replaced pattern "3" in FIG. 7D, on the operation unit 311 (Step S306). Then, the part-to-be-replaced identification processing ends.

The part-to-be-replaced identification unit 313 determines whether a toner bottle rotation error has occurred in the past in a case in which a bottle cover opening/closing error occurs in Step S301, but the part-to-be-replaced identification unit 313 is not limited to this configuration. For example, the part-to-be-replaced identification unit 313 may be configured to determine that a part to be replaced is the toner bottle drive motor 304 when a bottle cover opening/closing error has occurred within the predetermined period before the time when a toner bottle rotation error occurs. In the above-mentioned processing, for the bottle cover opening/closing error, an error having occurred in the predetermined period in the past is also taken into account in identifying a part that causes the error. For the bottle cover opening/closing error, any of the toner bottle drive motor 304, the bottle cover 307, and the cover opening/closing detection unit 309 is a cause of an error (i.e., there are a plurality of candidates for an error part). In this embodiment, an error having occurred in the past is taken into account in identifying a cause of an error, and a part that causes the error is identified from among those parts. With this processing, it is possible to accurately identify a part being a cause at the time of occurrence of an abnormality, and to speedily cope with the abnormality.

MODIFICATION EXAMPLE

In the embodiment described above, a part to be replaced is identified by using the logs of error information stored in the status accumulation unit 312 in the memory 302. This processing is performed in the image forming apparatus 200. In a modification example of the present disclosure, a case in which this processing is performed in an information processing apparatus provided externally to the image forming apparatus 200 is described. Here, description is given of a case in which an information processing apparatus connected to the image forming apparatus 200 via a network performs the processing.

Figure 9:
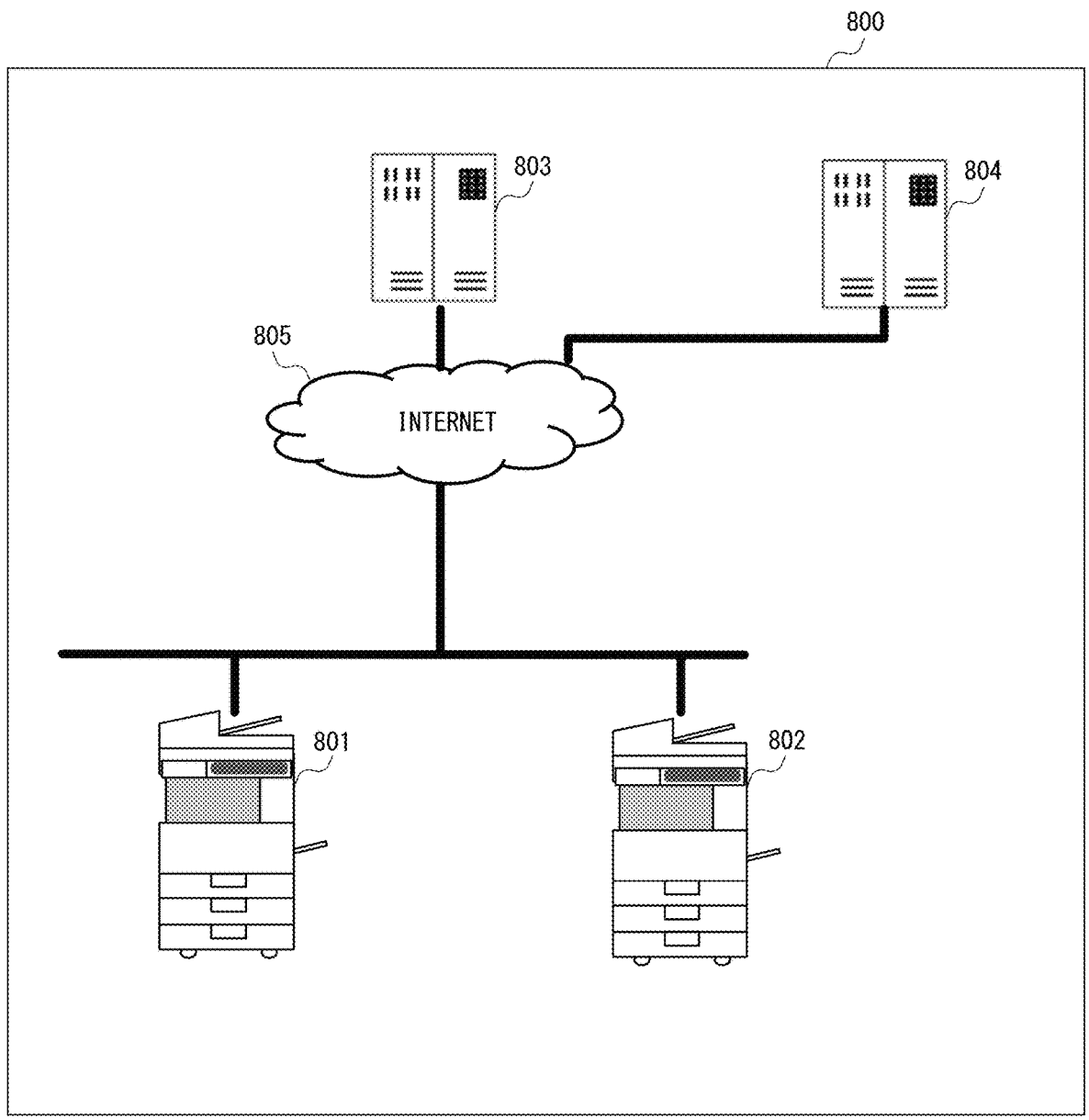
FIG. 9 is a configuration diagram of a part-to-be-replaced identification system.

FIG. 9 is a configuration diagram of a part-to-be-replaced identification system in which an external information processing apparatus identifies a part to be replaced in the image forming apparatus 200. A part-to-be-replaced identification system 800 includes one or more image forming apparatus 801 and 802, a server 803, and a management apparatus 804. In this modification example, two image forming apparatus 801 and 802 are provided in the part-to-be-replaced identification system 800. The image forming apparatus 801 and 802 each have a configuration in which a network interface is added to the image forming apparatus 200, and form an image on the sheet S to produce a printed product.

The image forming apparatus 801 and 802, the server 803, and the management apparatus 804 are capable of communicating to and from each other via a network. Here, the network is an Internet 805. The network may be a telecommunication line such as a local area network (LAN) or a wide area network (WAN). The server 803 and the management apparatus 804 function as an information processing apparatus that collects data from each of the image forming apparatus 801 and 802 and identifies a part to be replaced in each of the image forming apparatus 801 and 802 based on the collected data.

Each of the image forming apparatus 801 and 802 stores the logs of error information into the status accumulation unit 312 of the memory 302 by the processing of FIG. 6A and FIG. 6B. Each of the image forming apparatus 801 and 802 regularly transmits the logs stored in the status accumulation unit 312 to the server 803.

The server 803 stores therein the logs acquired from each of the image forming apparatus 801 and 802 for each of the image forming apparatus 801 and 802 from which the logs are acquired. For example, the server 803 assigns identification information for identifying a source of acquisition to the acquired log, and stores therein the log. As another example, the server 803 prepares in advance a storage area for each of the image forming apparatus 801 and 802, and stores the acquired logs in a corresponding storage area. The server 803 transmits the stored logs to the management apparatus 804 in response to a request from the management apparatus 804.

Figure 10:
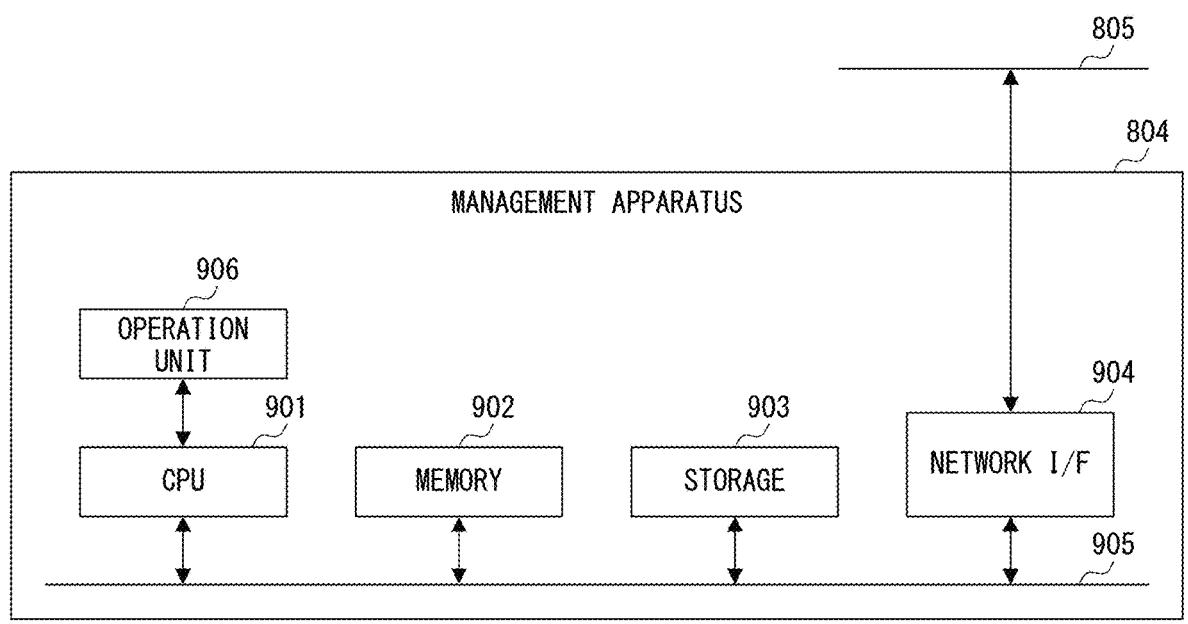
FIG. 10 is a configuration diagram of a management apparatus.

FIG. 10 is a configuration diagram of the management apparatus 804. The management apparatus 804 includes a CPU 901, a memory 902, a storage 903, a network interface (I/F) 904, and an operation unit 906. The CPU 901, the memory 902, the storage 903, and the network I/F 904 are connected to each other via a system bus 905 so as to be capable of communicating to and from each other. The I/F 904 functions as an acquisition unit that acquires information related to an error from the server 803.

The CPU 901 controls overall operation of the management apparatus 804. The memory 902 stores a starting program of the CPU 901 and data required for execution of the starting program. The storage 903 is a storage device with a larger capacity than that of the memory 902, and is, for example, a hard disk drive (HDD), a solid state drive (SSD), or the like. The storage 903 stores a control program or the like to be executed by the CPU 901.

The CPU 901 executes the starting program stored in the memory 902 at a start-up of the management apparatus 804. The starting program is a program for loading the control program stored in the storage 903 into the memory 902. The CPU 901 executes the control program loaded into the memory 902, and performs various kinds of control. Further, the CPU 901 communicates to and from another apparatus such as the server 803 via the Internet 805 by using the network I/F 904. The operation unit 906 has a function similar to that of the operation unit 311. The operation unit 906 notifies an instruction to start identification of a part to be replaced to the CPU 901. Moreover, the operation unit 906 displays a result of identification of a part to be replaced under the control of the CPU 901.

The CPU 901 performs the processing of FIG. 8, to thereby identify a part to be replaced. When an instruction to start identification of a part to be replaced is acquired from the operation unit 906, the CPU 901 acquires the error logs of the image forming apparatus 801 and 802 from the server 803. The instruction to start identification of a part to be replaced includes information indicating which image forming apparatus is a target of the processing. This information includes identification information related to the image forming apparatus, and information of the ID 601, an occurrence date, the cumulative number of pages, and a type of occurring error, for example. The CPU 901 acquires a log corresponding to the information from the server 803. From the log acquired from the server 803, the above-mentioned information is stored in the memory 902. Each of the occurrence date and the cumulative number of pages is timing information related to a time of error occurrence.

The CPU 901 analyses the acquired log, to thereby identify a part to be replaced in the image forming apparatus 801 and 802. For example, when a difference between the occurrence date (time) of a toner bottle rotation error and the occurrence date (time) of a bottle cover opening/closing error is one hour, the CPU 901 determines that a part to be replaced (error part) is the toner bottle drive motor 304. In a case in which an action is required to be taken as a result of the identification, the CPU 901 displays details of the action to be taken on the operation unit 906. As another example, the CPU 901 outputs a part to be replaced (error part) that is selected from a plurality of candidates on the display of the operation unit 906. As still another example, the CPU 901 controls the operation unit 311 of the image forming apparatus that requires part replacement to display details of the action to be taken. In this manner, when an error occurs in the image forming apparatus 801 and 802 being managed, the part-to-be-replaced identification system 800 can identify a part to be replaced corresponding to the error, and issue an instruction for maintenance work.

As described above, the image forming apparatus 200 of this embodiment identifies a part to be replaced in order to overcome an error by using information of another error having occurred within a predetermined period before the time when the error occurs. This enables accurate identification of a part to be replaced, which would be difficult only with information related to the error. This processing enables accurate identification of a part to be replaced also for an error that occurs in a part other than a regularly-consumed part or occurs unexpectedly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-205977, filed Dec. 20, 2021, which is hereby incorporated by reference herein in its entirety.

What is claimed is:

1. An information processing apparatus that communicates with an image forming apparatus that forms an image on a sheet,
    the image forming apparatus including:
        a motor;
        a first load;
        a second load;
        a drive transmission mechanism configured to selectively transmit drive of the motor to the first load and the second load; and
        a control unit configured to control (i) the drive transmission mechanism to transmit the drive of the motor to the first load so that the first load is driven and (ii) the drive transmission mechanism to transmit the drive of the motor to the second load so that the second load is driven,
    the information processing apparatus comprising:
        an acquisition unit configured to acquire information related to an error that has occurred in the image forming apparatus, the information including timing information indicating a cumulative number of pages on which the image forming apparatus has printed images when the error occurs;
        a memory configured to store the information acquired by the acquisition unit; and
        a controller configured to:
            determine an error part in the image forming apparatus from among a plurality of candidates including the motor, the first load, and the second load, based on first timing information and second timing information, wherein the first timing information is included in the information in the memory and indicates a cumulative number of pages on which the image forming apparatus has printed images when an error of the first load occurred, and wherein the second timing information is included in the information in the memory and indicates a cumulative number of pages on which the image forming apparatus has printed images when an error of the second load occurred; and
            output a result of the determination of the error part,
        wherein the controller is configured to determine the error part from among the plurality of candidates based on a difference between the cumulative number of pages indicated by the first timing information and the cumulative number of pages indicated by the second timing information.

2. The information processing apparatus according to claim 1, further comprising a display configured to display the result of the determination of the error part.

3. An information processing apparatus that communicates with an image forming apparatus that forms an image on a sheet,
    the image forming apparatus including:
        a motor;
        a first load;
        a second load;
        a drive transmission mechanism configured to selectively transmit drive of the motor to the first load and the second load; and
        a control unit configured to control (i) the drive transmission mechanism to transmit the drive of the motor to the first load so that the first load is driven and (ii) the drive transmission mechanism to transmit the drive of the motor to the second load so that the second load is driven,
    the information processing apparatus comprising:
        an acquisition unit configured to acquire information related to an error that has occurred in the image forming apparatus, the information including timing information indicating a cumulative number of pages on which the image forming apparatus has printed images when the error occurs;
        a memory configured to store the information acquired by the acquisition unit; and
        a controller configured to:
            determine an error part in the image forming apparatus from among a plurality of candidates including the motor, the first load, and the second load, based on first timing information and second timing information, wherein the first timing information is included in the information in the memory and indicates a cumulative number of pages on which the image forming apparatus has printed images when an error of the first load occurred, and wherein the second timing information is included in the information in the memory and indicates a cumulative number of pages on which the image forming apparatus has printed images when an error of the second load occurred;
            output a result of the determination of the error part;

a mount onto which a container accommodating developer is to be mounted; and a cover configured to be opened when replacing the container mounted onto the mount, wherein the first load is the container mounted onto the mount of the image forming apparatus, and wherein the second load is the cover.

4. An image forming apparatus for forming an image on a sheet, the image forming apparatus comprising:
   a motor;
   a first load;
   a second load;
   a drive transmission mechanism configured to selectively transmit drive of the motor to the first load and the second load;
   a memory; and
   a control unit configured to:
      control the drive transmission mechanism to transmit the drive of the motor to the first load so that the first load is driven;
      control the drive transmission mechanism to transmit the drive of the motor to the second load so that the second load is driven;
      store first timing information related to a time of occurrence of an error of the first load into the memory, the first timing information being a cumulative number of pages on which the image forming apparatus has printed images when the error of the first load occurs;
      store second timing information related to a time of occurrence of an error of the second load into the memory, the second timing information being a cumulative number of pages on which the image forming apparatus has printed images when the error of the second load occurs; and
      determine an error part in the image forming apparatus from among a plurality of candidates including the motor, the first load, and the second load, based on the first timing information in the memory and the second timing information in the memory,
   wherein the control unit is configured to determine the error part from among the plurality of candidates based on a difference between the cumulative number of pages indicated by the first timing information and the cumulative number of pages indicated by the second timing information.

5. The image forming apparatus according to claim 4, further comprising a display configured to display a result of the determination of the error part.

6. An image forming apparatus for forming an image on a sheet, the image forming apparatus comprising:
   a motor;
   a first load;
   a second load;
   a drive transmission mechanism configured to selectively transmit drive of the motor to the first load and the second load;
   a memory; and
   a control unit configured to:
      control the drive transmission mechanism to transmit the drive of the motor to the first load so that the first load is driven;
      control the drive transmission mechanism to transmit the drive of the motor to the second load so that the second load is driven;
      store first timing information related to a time of occurrence of an error of the first load into the memory, the first timing information being a cumulative number of pages on which the image forming apparatus has printed images when the error of the first load occurs;
      store second timing information related to a time of occurrence of an error of the second load into the memory, the second timing information being a cumulative number of pages on which the image forming apparatus has printed images when the error of the second load occurs; and
      determine an error part in the image forming apparatus from among a plurality of candidates including the motor, the first load, and the second load, based on the first timing information in the memory and the second timing information in the memory,
   a mount onto which a container accommodating developer is to be mounted; and
   a cover configured to be opened when replacing the container mounted onto the mount,
   wherein the first load is the container mounted onto the mount of the image forming apparatus, and
   wherein the second load is the cover.

7. An information processing apparatus that communicates with an image forming apparatus that forms an image on a sheet,
   the image forming apparatus comprising:
      a motor;
      a first load;
      a second load;
      a drive transmission mechanism configured to selectively transmit drive of the motor to the first load and the second load;
      a first sensor configured to detect that the first load has been properly driven;
      a second sensor configured to detect that the second load has been properly driven; and
      a memory configured to store an error that has occurred in the image forming apparatus;
   the information processing apparatus comprising:
      a controller configured to:
         determine that the motor is an error part in a case where a first-type error has occurred within a predetermined period before a time at which a second-type error has occurred, the first-type error indicating that the first load has not been properly driven, and the second-type error indicating that the second load has not been properly driven; and
         determine that the second sensor is the error part in a case where, within the predetermined period before the time at which the second-type error has occurred, the first-type error has not occurred and the second-type error has occurred; and
      a display configured to display the error part determined by the controller.

8. The information processing apparatus according to claim 7, wherein the controller is configured to determine that the second load is also the error part in a case where, in the predetermined period before the time at which the second-type error has occurred, the first-type error has not occurred and the second-type error has occurred.

9. The information processing apparatus according to claim 7, wherein the controller is configured to determine that each of the motor and the second sensor is the error part in a case where neither the first-type error nor the second-type error has occurred within the predetermined period before the time at which the second-type error has occurred.

10. The information processing apparatus according to claim 7, wherein the memory stores a cumulative number of sheets on which the image forming apparatus has formed images at the time of occurrence of the error in the image forming apparatus, and the predetermined period is determined based on the cumulative number of sheets.

11. The information processing apparatus according to claim 7, wherein the memory is configured to store date and time information when the error occurs in the image forming apparatus, and
wherein the predetermined period is determined based on the date and time information.

12. An image forming apparatus that forms an image on a sheet, the image forming apparatus comprising:
a motor;
a first load;
a second load;
a drive transmission mechanism configured to selectively transmit drive of the motor to the first load and the second load;
a first sensor used to detect that the first load has been properly driven;
a second sensor used to detect that the second load has been properly driven; and
a memory configured to store an error that has occurred in the image forming apparatus;
and a controller configured to:
determine that the motor is an error part in a case where a first-type error has occurred within a predetermined period before a time at which a second-type error has occurred, the first-type error indicating that the first load has not been properly driven, and the second-type error indicating that the second load has not been properly driven; and
determine that the second sensor is the error part in a case where, within the predetermined period before the time at which the second-type error has occurred, the first-type error has not occurred and the second-type error has occurred, and
a display configured to display the error part determined by the controller.

13. The image forming apparatus according to claim 12, wherein the controller is configured to determine that the second load is also the error part in a case where, within the predetermined period before the time at which the second-type error has occurred, the first-type error has not occurred and the second-type error has occurred.

14. The image forming apparatus according to claim 12, wherein the controller is configured to determine that each of the motor and the second sensor is the error part in a case where neither the first-type error nor the second-type error has occurred within the predetermined period before the time at which the second-type error has occurred.

15. The image forming apparatus according to claim 12, wherein the memory stores a cumulative number of sheets on which the image forming apparatus has formed images at the time of occurrence of the error in the image forming apparatus, and the predetermined period is determined based on the cumulative number of sheets.

16. The image forming apparatus according to claim 12, wherein the memory is configured to store date and time information when the error occurs in the image forming apparatus, and
wherein the predetermined period is determined based on the date and time information.

* * * * *